United States Patent

Gellert

(10) Patent No.: US 6,447,283 B1
(45) Date of Patent: *Sep. 10, 2002

(54) INJECTION MOLDING HEATER WITH MELT BORE THERETHROUGH

(76) Inventor: Jobst Ulrich Gellert, 7A Price St., Georgetown, Ontario (CA), L7G 2X1

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,490

(22) Filed: Jun. 8, 1999

(30) Foreign Application Priority Data

Jun. 1, 1999 (CA) .................................. 2273517

(51) Int. Cl.7 .............................................. B29C 45/72
(52) U.S. Cl. .................... 425/547; 264/328.14; 425/549
(58) Field of Search ............................... 425/547, 548, 425/549, DIG. 110, DIG. 245; 264/328.14, 328.15

(56) References Cited

U.S. PATENT DOCUMENTS

| | | | |
|---|---|---|---|
| 4,309,163 A | * | 1/1982 | Cottancin .................... 425/543 |
| 4,340,156 A | | 7/1982 | Mueller ................. 222/146 HE |
| 4,355,460 A | | 10/1982 | Gellert ........................ 29/611 |
| 4,433,969 A | | 2/1984 | Gellert |
| 4,438,325 A | | 3/1984 | Gellert ........................ 219/536 |
| 4,500,279 A | | 2/1985 | Devellian et al. |
| 4,648,546 A | | 3/1987 | Gellert |
| 4,688,622 A | | 8/1987 | Gellert ........................ 164/61 |
| 5,007,821 A | | 4/1991 | Schmidt |
| 5,232,710 A | * | 8/1993 | Miyazawa et al. .......... 425/130 |
| 5,496,168 A | * | 3/1996 | Renwick ..................... 425/547 |
| 5,539,857 A | | 7/1996 | McGrevy .................... 392/484 |
| 5,639,489 A | * | 6/1997 | Van Boekel ................ 425/547 |
| 5,853,631 A | * | 12/1998 | Linehan ..................... 264/40.6 |

FOREIGN PATENT DOCUMENTS

| | | |
|---|---|---|
| EP | 0 551 830 | 7/1993 |
| EP | 0 681 899 | 11/1995 |
| EP | 0 816 046 | 1/1998 |

* cited by examiner

*Primary Examiner*—James P. Mackey
*Assistant Examiner*—Emmanuel Luk
(74) *Attorney, Agent, or Firm*—Foley & Lardner

(57) ABSTRACT

An injection molding heater (38) having one or more melt bores (78) extending therethrough to be removably mounted between the melt distribution manifold (26) and each nozzle (10) in a multi-gate injection molding system. The heater (38) has a plate-like body (92) made of a thermally conductive material and heat is provided to it by a heating element (98) which can be electrical or a heat pipe or by a heated fluid flowing through a passage (126) in the plate-like body (92). Each one or more of the heaters (38) can be connected to separately controlled power sources to separately adjust the heat provided by the heaters (38).

38 Claims, 5 Drawing Sheets

INJECTION MOLDING HEATER WITH MELT BORE THERETHROUGH

BACKGROUND OF THE INVENTION

This invention relates generally to injection molding and more particularly to an electrical heater with a melt bore extending therethrough to be mounted between a melt distribution manifold and a nozzle.

As seen in U.S. Pat. No. 5,007,821 to Schmidt which issued Apr. 16, 1991, it is known in hot runner technology to attach a separate plate heater to the rear face of a melt distribution manifold. It is also known to mount a separate electrical heater around a nozzle. While this is satisfactory for some applications, it has the disadvantage that the heat transfer is not very efficient. In cases where more heat is required, it is well known to provide heating elements extending integrally in melt distribution manifolds and in nozzles. While this heat transfer is much more efficient, this has the disadvantage of being more costly to produce.

The applicant's U.S. Pat. No. 4,433,969 which issued Feb. 28, 1984 shows that it is also known to mount a bushing through which the melt flows between the front face of the melt distribution manifold and the rear end of the nozzle.

SUMMARY OF THE INVENTION

Accordingly, it is an object of the present invention to at least partially overcome the disadvantages of the prior art by providing a separate removable heater having a melt bore extending therethrough which can be mounted between the melt distribution manifold and each nozzle. This is used to provide less heat in some cases and more supplementary heat in other cases.

To this end, in one of its aspects, the invention provides an injection molding heater having a plate-like body and means to heat the body. The plate-like body is made of a thermally conductive material and has one or more melt bores extending therethrough from its rear face to its front face.

In another of its aspects, the invention provides a hot runner injection molding apparatus having a melt distribution manifold and a plurality of nozzles seated in a mold with a melt passage branching in the melt distribution manifold from a common inlet and extending through each of the nozzles towards one or more cavities. A heater is removably mounted between the melt distribution manifold and one or more of the nozzles. Each heater has a plate-like body and means to heat the body. The body is made of a thermally conductive material and has one or more melt bores extending therethrough from its rear face to its front face. The rear face abuts against the melt distribution manifold, the front face abuts against one of the nozzles, and the melt bore extending through the heater forms a portion of the melt passage.

In a further aspect, the invention provides a hot runner injection molding apparatus having a melt distribution manifold and a plurality of nozzles seated in a mold with a melt passage branching in the melt distribution manifold from a common inlet and extending through each of the nozzles towards one or more cavities. A number of heaters are each removably mounted between the melt distribution manifold and one or more of the nozzles. Each heater has a plate-like body and means to heat the body. The plate-like body is made of a thermally conductive material and has one or more melt bores extending therethrough from its rear face to its front face. The rear face abuts against the melt distribution manifold and the front face abuts against one of the nozzles. The melt bore extending through the heater forms a portion of the melt passage and there are means to separately adjust the temperature of one or more of the heaters.

Further objects and advantages of the invention will appear from the following description taken together with the accompanying drawings.

DETAILED DESCRIPTION OF THE INVENTION

Figure 1:
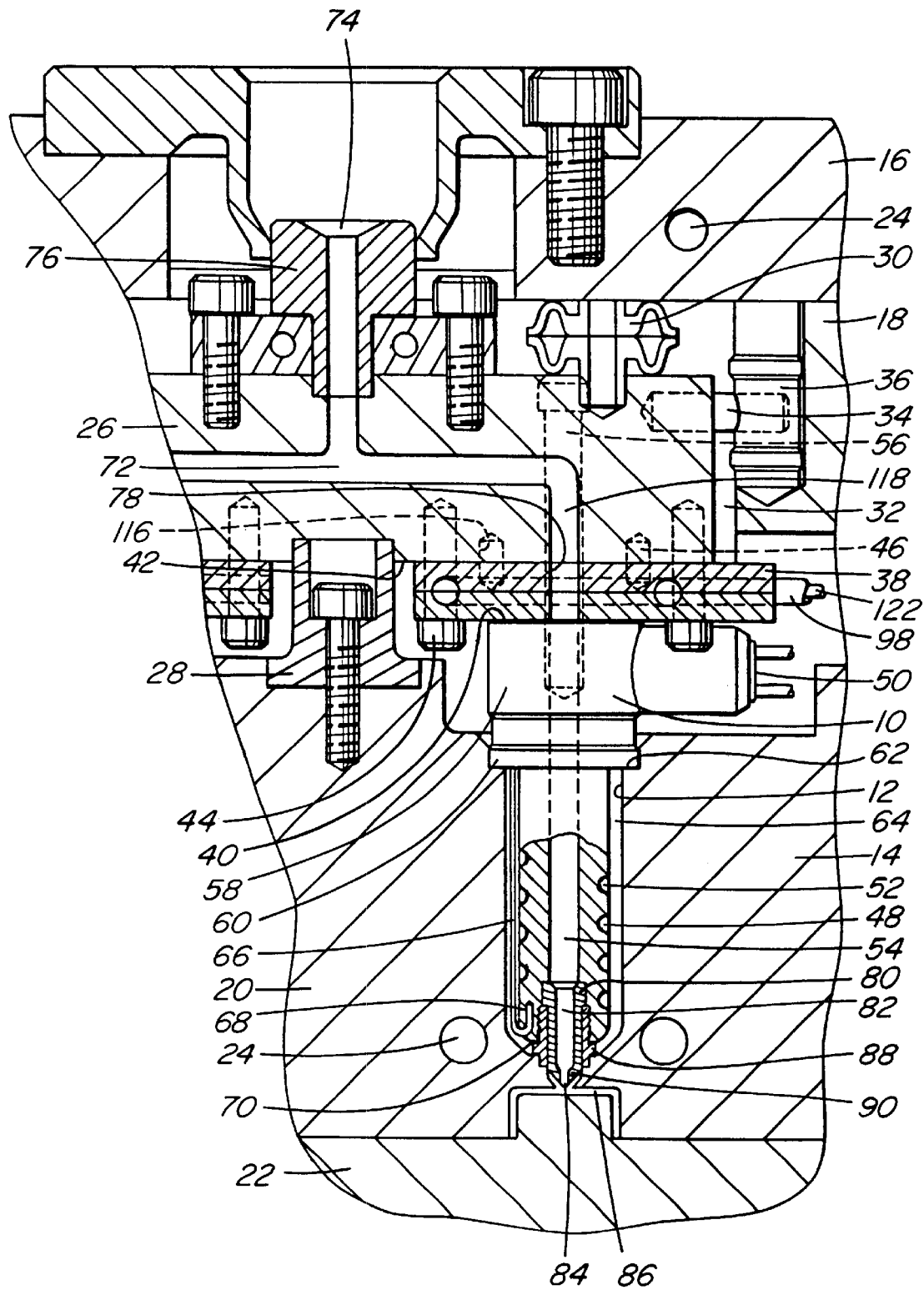
FIG. 1 is a sectional view of a portion of an injection molding system showing a heater according to one embodiment of the invention.

Reference is first made to FIG. 1 which shows a portion of a multi-cavity injection molding system or apparatus according to a first embodiment of the invention having a number of heated nozzles 10, each seated in a well 12 in a mold 14. While the mold 14 usually has a greater number of plates depending upon the application, in this case, only a back plate 16, a manifold plate 18, a cavity plate 20, and a core plate 22 are shown for ease of illustration. The mold 18 is cooled by pumping cooling water through cooling conduits 24. A melt distribution manifold 26 is mounted between the cavity plate 20 and the back plate 16 by a central locating ring 28 and a number of insulative spacers 30 to provide an insulative air space 32 between the melt distribution manifold 26 and the surrounding cooled mold 14. The melt distribution manifold 26 is accurately aligned in place by a locating pin 34 extending outwardly into a cam 36 seated in the manifold plate 18.

A heater 38 according to the invention is removably mounted between the rear end 40 of each heated nozzle 10 and the front face 42 of the melt distribution manifold 26 by screws 44 which extend into the melt distribution manifold 26. The heater 38 is a accurately aligned in place by locating pins 46 which extend from it into the melt distribution manifold 26. Each nozzle 10 has a heating element 48. In this embodiment, the heating element 48 is an integral electrical heating element 48 with a terminal 50 and a helical portion 52 extending around a central melt bore 54. In other applications, the heater 38 at the rear end 40 of the nozzle 10 and the melt itself may supply sufficient heat that a heating element is not required in the nozzle 10. As can be seen, in this embodiment, each heated nozzle 10 is secured to its respective electrical heater 38 and the melt distribution manifold 26 by bolts 56 extending through the melt distribution manifold 26 and the heater 38. An outer collar 58 at the rear end 40 of each nozzle 10 has a forwardly extending flange portion 60 which sits on a circular seat 62 in the mold 14 to locate the rear end 40 of the heated nozzle 10 to provide an insulative air space 64 between the heated nozzle 10 and the surrounding cooled mold 14. A removable thermocouple element 66 extends through the air space 64 into an opening 68 in the front end 70 of the heated nozzle 10 to moniter and control the operating temperature.

A melt passage 72 extends from a central inlet 74 in an inlet portion 76 of the melt distribution manifold 26 and branches outwardly in the melt distribution manifold 26 to convey melt through a melt bore 78 in each electrical heater 38 to the central melt bore 54 in each heated nozzle 10. Melt bore 78 defines a substantially straight path through the heater 38, from one face of the heater to the other, substantially perpendicular to the faces. In this embodiment, a two-piece nozzle seal 80 is screwed into the front end 70 of each heated nozzle 10. Each two-piece nozzle seal 80 has a melt bore 82 aligned with the central melt bore 54 through the heated nozzle 10 and a gate 84 leading to a cavity 86. The heated nozzle 10 is made of steel, the outer piece 88 of the two-piece nozzle seal 80 is made of a titanium alloy and the inner piece 90 of the two-piece nozzle seal 80 is made of a material such as beryllium copper having a combination of thermal conductivity and wear and corrosion resistance suitable for the material being molded.

Figure 2:
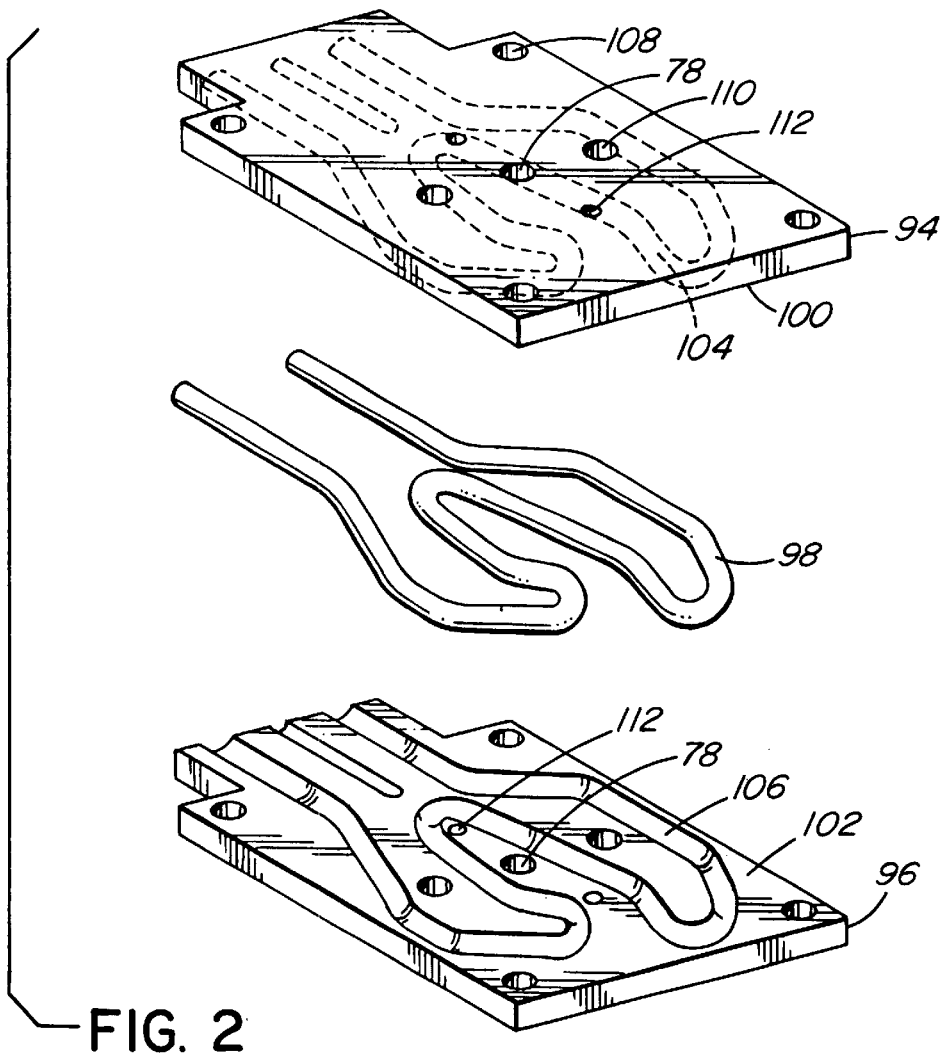
FIG. 2 is an isometric view showing the components of the heater seen in FIG. 1.
Figure 3:
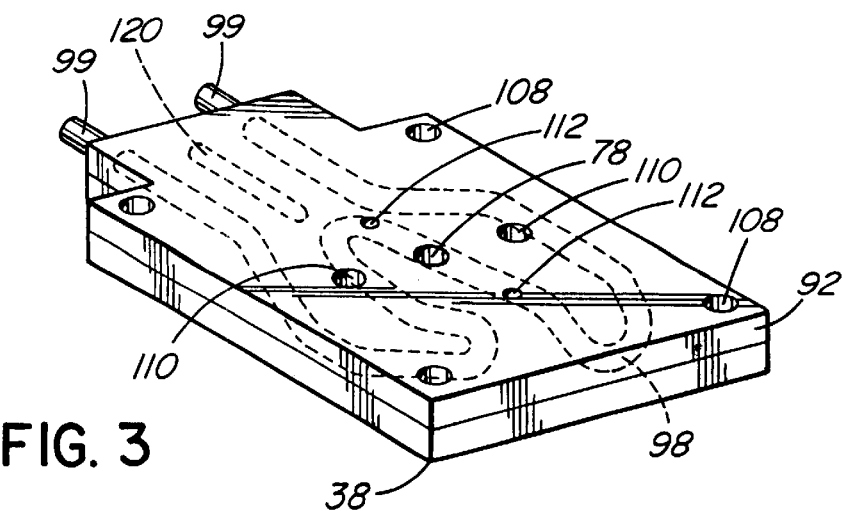
FIG. 3 is an isometric view of the same heater with the components integrally joined together.

Referring also to FIGS. 2 and 3, each heater 38 has a plate-like body 92 which in this embodiment is made of a rear plate 94 and a front plate 96 which are joined together with an electrical heating element 98 extending therebetween with terminal portions 99 extending outwardly from the planar body 92 to be connected to leads (not shown) from a controlled power supply. The rear plate 94 and the front plate 96 are made of a suitable thermally conductive material such as H13 steel. In this embodiment, the front face 100 of the rear plate 94 and the rear face 102 of the front plate 96 have matching channels 104, 106 therein wherein the electrical heating element 98 is received when the plates 94, 96 are joined together. The configuration of the channels 104, 106 and the heating element 98 is designed to provide the heater 38 with a desired temperature pattern depending upon the application. In this embodiment, the plates 94, 96 and the electrical heating element 98 are integrally brazed together, but in another embodiment (not shown) the plates 94, 96 are joined together with screws. While the heater 38 is shown with the channels 104, 106 in both the front face 100 of the rear plate 94 and the rear face 102 of the front plate 96, in other embodiments the electrical heating element is received in a channel in either the front face 100 of the rear plate 94 or the rear face 102 of the front plate 96. In addition to the central melt bore 78, each heater 38 has holes 108 through which the screws 44 extend to secure it to the melt distribution manifold 26 and holes 110 through which the bolts 56 extend to secure the nozzle 10, heater 38 and melt distribution manifold 26 together. Of course, other arrangements can be used to fasten them together or they can just be secured in place by pressure between the nozzles 10 and the melt distribution manifold 26. Each heater 38 also has holes 112 from which the locating pins 46 extend into matching holes 116 in the melt distribution manifold 26 to accurately locate the heater 38 in place with its melt bore 78 aligned with one branch 118 of the melt passage 72 in the melt distribution manifold 26 and the central melt bore 54 through the adjacent nozzle 10. The heater 38 also has an opening 120 into which a removable thermocouple element 122 is inserted to monitor and control the operating temperature of the heater 38.

In use, the apparatus is first installed as shown in FIG. 1 and described above. Electrical power is then applied to the heating elements 48 in each of the nozzles 10 and to the heating elements 98 in each of the heaters 38 to heat them to a predetermined operating temperature. The heating elements 98 in the heaters 38 can be connected in series or in parallel. Alternatively, each heating element 98 or one or more groups of the heating elements 98 can be connected to a separately controlled power source (not shown) to individually adjust its temperature. In order to maintain the whole melt passage 72 at a uniform temperature it can be necessary to provide more heat from some heaters 38 than from others. For instance, less heat is usually required from heaters 38 in the center of the mold 14 than from those around the periphery. Pressurized melt is applied from a molding machine (not shown) to the central inlet 74 of the melt passage 72 to provide sprue gating according to a predetermined injection cycle. The melt flows through the melt distribution manifold 26, the melt bores 78 in the heaters 38, the aligned melt bores 54 in the heated nozzles 10, the aligned melt bores 80 through the two-piece nozzle seals 80 and through the gates 88 into the cavities 90. After the cavities 90 are filled and a suitable packing and cooling period has expired, the injection pressure is released and the melt conveying system is decompressed to avoid stringing through the open gates 88. The mold 14 is then opened to eject the molded products. After ejection, the mold 14 is closed and the cycle is repeated continuously with the cycle time dependent upon the size of the cavities 90 and the type of material being molded.

Figure 4:
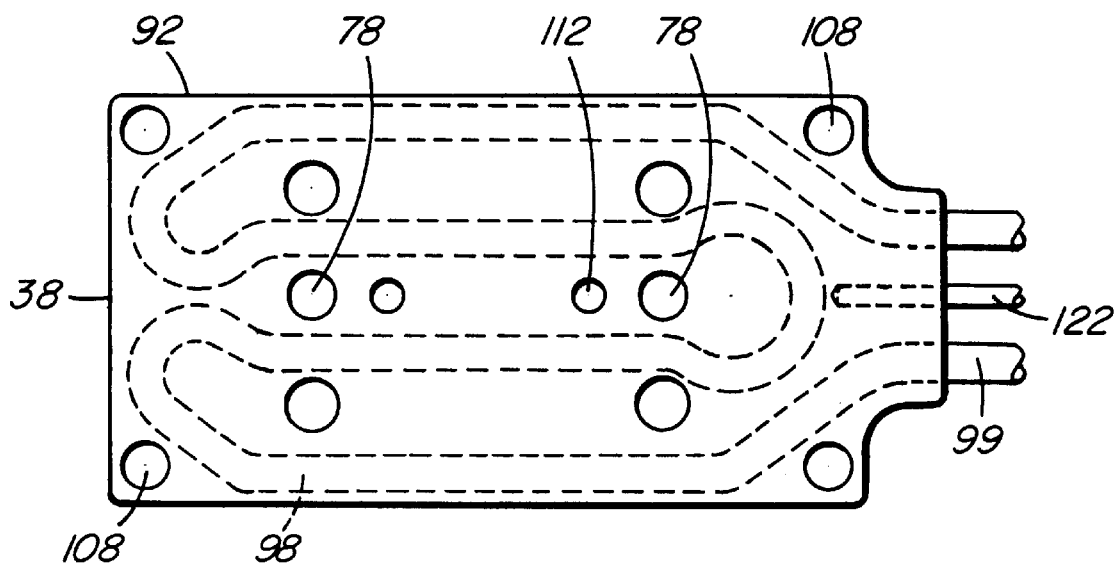
FIG. 4 is a plan view of a heater according to another embodiment of the invention.
Figure 5:
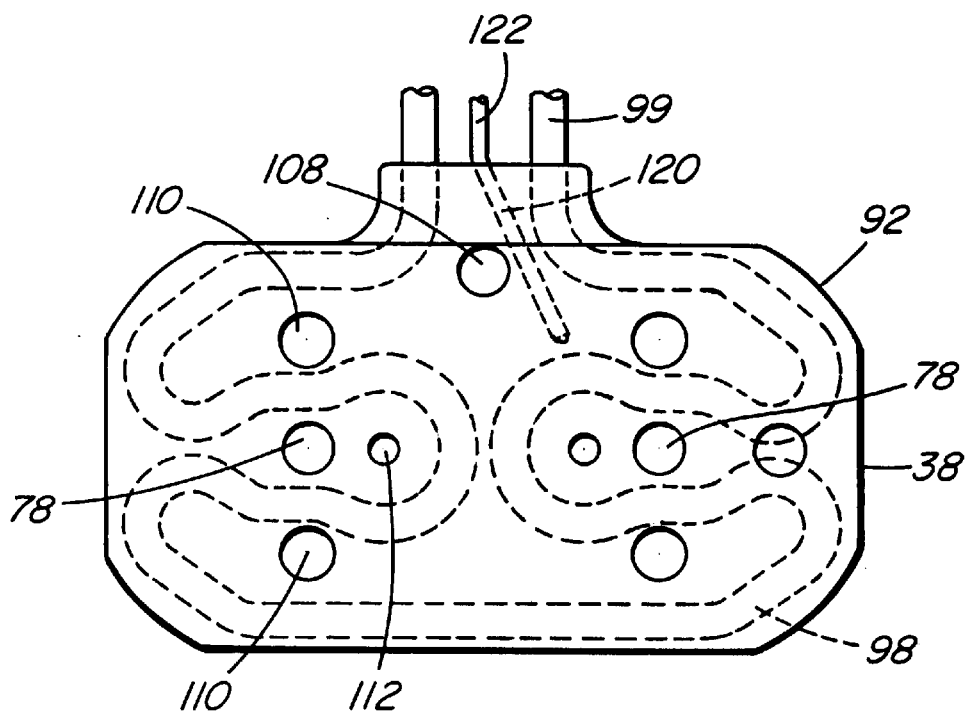
FIG. 5 is a plan view of a heater according to a further embodiment of the invention.

Reference is now made to FIGS. 4 and 5 which show a heater 38 according to different embodiments of the invention. Most of the elements of these embodiments are similar to those described above and common elements are described and illustrated using the same reference numerals. Each heater 38 has a plate-like body 92 with two melt bores 78 extending therethrough rather than one. This allows the heater 38 to be mounted between the melt distribution manifold 26 and two adjacent nozzles 10. In alternate embodiments, the heater 38 can have three or more melt bores extending therethrough to be mounted with three or more adjacent nozzles 10. As can be seen, each heater 38 has an integral electrical heating element 98, a hole 108 for a screw 44, holes 110 for the bolts 56, holes 112 for the locating pins 112 and an opening 120 to receive a thermocouple element 122 as described above.

Figure 6:
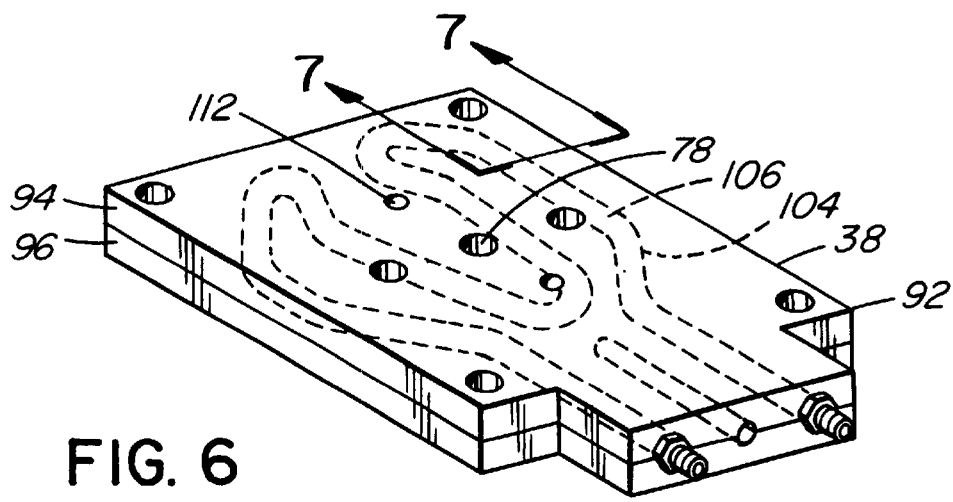
FIG. 6 is an isometric view of a heater according to another embodiment of the invention.
Figure 7:
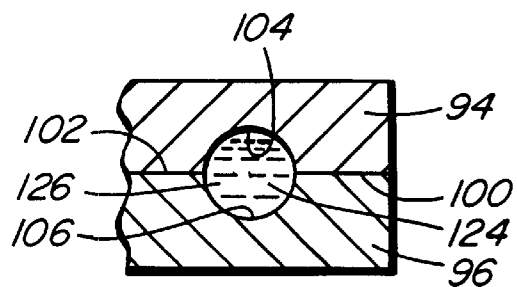
FIG. 7 is a sectional view along line 7–7 in FIG. 6.

Reference is now made to FIGS. 6 and 7 showing a heater 38 according to another embodiment of the invention. In this case, the plate-like body 92 is again made of rear and front plates 94, 96 having matching channels 104, 106 therein integrally brazed together. However, in this case rather than having a heating element the heat is provided by pumping a heating fluid 124 such as hot oil through a passage 126 formed by the channels 104, 106 in the two plates 94, 96.

Figure 8:
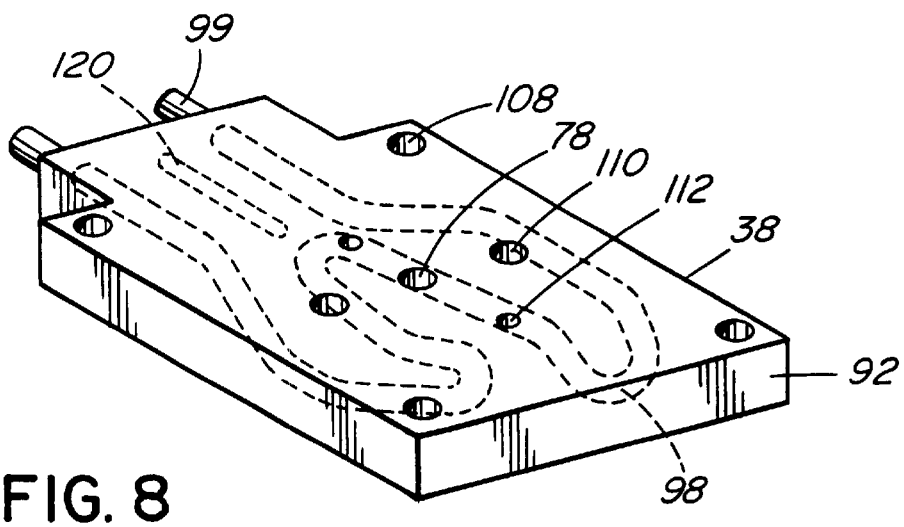
FIG. 8 is an isometric view of a heater according to another embodiment of the invention.

Reference is now made to FIG. 8 showing a heater 38 according to a further embodiment. In this case, the heater 38 has an electrical heating element 98 which is integrally cast in a one-piece plate-like body 92 made of a suitable thermally conductive material such as H13 steel; The casting is preferably done in a vacuum furnace which bonds the two materials together to allow maximum heat transfer between them as described in the applicant's U.S. Pat. No. 4,355,460 which issued Oct. 26, 1982 and is specifically incorporated in its entirety herein. As can be seen, the plate-like body 92 similarly has a central melt bore 78, holes 108 for the screws 44, holes 110 for the bolts 56, holes 112 for the locating pins 112 and an opening 120 to receive a thermocouple element 122 as described above.

Figure 9:
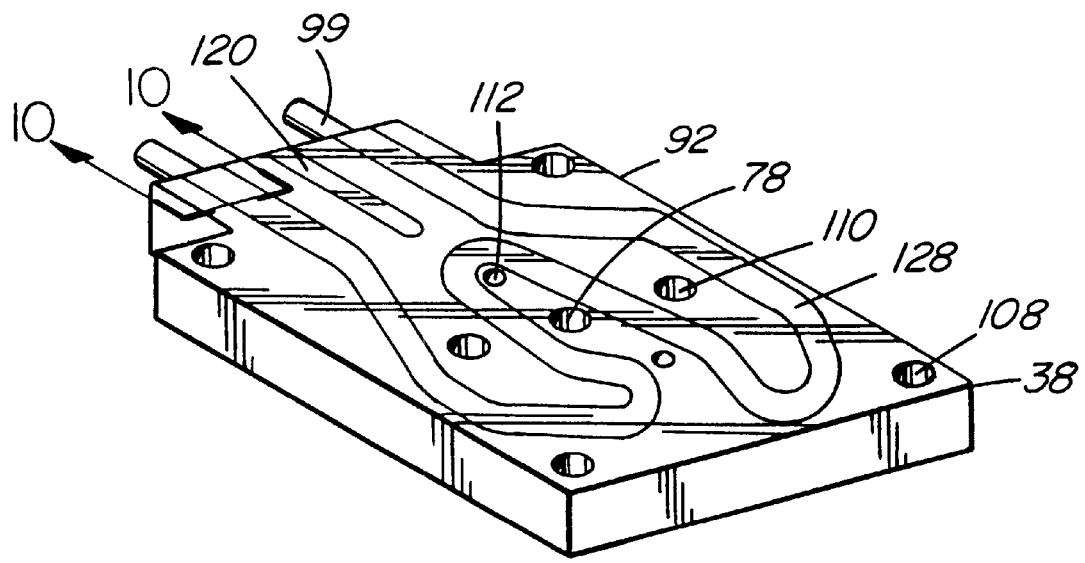
FIG. 9 is an isometric view of a heater according to a further embodiment of the invention.
Figure 10:
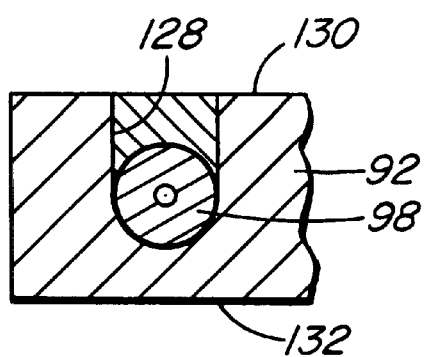
FIG. 10 is a sectional view along line 10—10 in FIG. 9.

Finally, reference is made to FIGS. 9 and 10 which show a heater 38 according to another embodiment of the invention. In this case, the plate-like body 92 is made of one-piece and an electrical heating element 98 is integrally brazed in a channel 128 in its rear face 130 as described in the applicant's U.S. Pat. No. 4,648,546 which issued Mar. 10, 1987 and is specifically incorporated in its entirety herein. In an alternate embodiment, the channel 128 can be in the front face 132 rather than the rear face 130 of the one-piece plate-like body 92. In other embodiments the heating element 98 can be one or more conventional cartridge type resistance heaters or heat pipes extending into one or more bores in the one-piece body 92 as described in U.S. Pat. No. 4,500,279 to Devellian et al. which issued Feb. 19, 1985 and is specifically incorporated in its entirety herein.

While the description of the injection molding apparatus having heaters removably mounted between the melt distribution manifold and the nozzles has been given with respect to preferred embodiments, it will be evident that various other modifications are possible without departing from the scope of the invention as understood by those skilled in the art and as provided in the following claims.

The embodiments of the invention in which an exclusive property or privilege is claimed is defined as follows:

1. A heater for a melt distribution manifold of an injection molding machine having at least one injection nozzle, the heater (38) having a plate-like body (92) adapted to be interposed between and contact the manifold and the at least one nozzle, and means to heat the plate-like body (92), the plate-like body (92) having a rear face (130) adapted to contact the melt distribution manifold, a front face (132) adapted to contact the at least one nozzle, and at least one melt bore (78) extending therethrough, each of said melt bores (78) defining a substantially straight path through the plate-like body (92) from the rear face (130) to the front face (132) thereof.

2. An injection molding manifold heater (38) as claimed in claim 1 further including means to mount the heater (38) to a melt distribution manifold (26).

3. An injection molding manifold heater (38) as claimed in claim 1 wherein the heating means is a passage (126) extending in the plate-like body (92) through which a heating fluid (124) flows.

4. An injection molding manifold heater (38) as claimed in claim 3 wherein the heating fluid (124) is oil.

5. An injection molding manifold heater (38) as claimed in claim 1 wherein the heating means is at least one heating element (98) extending in the plate-like body (92).

6. An injection molding manifold heater (38) as claimed in claim 5 wherein the at least one heating element (98) is removable.

7. An injection molding manifold heater (38) as claimed in claim 5 wherein the at least one heating element (98) is an electrical cartridge type heater.

8. An injection molding manifold heater (38) as claimed in claim 5 wherein the at least one heating element (98) is a heat pipe.

9. An injection molding manifold heater (38) as claimed in claim 5 wherein the at least one heating element (98) is an integral electrical heating element (98) with at least one terminal portion (99).

10. An injection molding manifold heater (38) as claimed in claim 5 wherein the plate-like body (92) is a one-piece body (92) into which the at least one heating element (98) is integrally cast.

11. An injection molding manifold heater (38) as claimed in claim 5 wherein the plate-like body (92) is a one-piece body (92) with a rear face (130) and a front face (132), at least one of the rear and front faces (130, 132) having a channel (128) in which the at least one heating element (98) is integrally brazed.

12. An injection molding manifold heater (38) as claimed in claim 5 wherein the plate-like body (92) has a rear plate (94) and a front plate (96) joined together with the at least one heating element (98) extending therebetween.

13. An injection molding manifold heater (38) as claimed in claim 12 wherein the rear plate (94) has a front face (100) and the front plate (96) has a rear face (102), at least one of the front face (100) of the rear plate (94) and the rear face (102) of the front plate (96) having a channel (104, 106) in which the at least one heating element (98) extends.

14. An injection molding manifold heater (38) as claimed in claim 13 wherein the rear plate (94) and the front plate (96) are integrally brazed together and the at least one heating element (98) is an electrical heating element (98) integrally brazed into said channel (104, 106).

15. An injection molding manifold heater (38) as claimed in claim 14 wherein the rear plate (94) and the front plate (96) are made of steel.

16. An injection molding manifold heater (38) as claimed in claim 1 wherein the plate-like body (92) has an opening (120) extending therein to receive a thermocouple element (122).

17. In a hot runner injection molding apparatus having at least one nozzle (10) seated in a mold (14), a melt distribution manifold (26), and a melt passage (72) extending from an inlet (74) through the melt distribution manifold (26) and the at least one nozzle (10) towards at least one mold cavity (86), the improvement comprising:

a heater (38) mounted upstream of the at least one nozzle (10), the heater (38) having a plate-like body (92) and means to heat the plate-like body (92), the plate-like body (92) being made of a thermally conductive material and having a rear face (130), a front face (132), and at least one melt bore (78) extending therethrough, each of said melt bores (78) defining a substantially straight path through the plate-like body (92) from the rear face (130) to the front face (132) thereof, the rear face (130) abutting against the melt distribution manifold (26), the front face (132) abutting against the at least one nozzle (10), and the at least one melt bore (78) forming a portion of the melt passage (72).

18. Hot runner injection molding apparatus as claimed in claim 17 further comprising means to removably mount the heater (38) between the melt distribution manifold (26) and the at least one nozzle (10).

19. Hot runner injection molding apparatus as claimed in claim 17 wherein the heater comprises a passage (126) extending in the plate-like body (92) through which a heating fluid (124) flows.

20. Hot runner injection molding apparatus as claimed in claim 17 wherein the heater comprises at least one heating element (98) extending in the plate-like body (92).

21. Hot runner injection molding apparatus as claimed in claim 20 wherein the at least one heating element (98) is removable.

22. Hot runner injection molding apparatus as claimed in claim 20 wherein the at least one heating element (98) is an electrical cartridge type heater.

23. Hot runner injection molding apparatus as claimed in claim 20 wherein the at least one heating element (98) is a heat pipe.

24. Hot runner injection molding apparatus as claimed in claim 20 wherein the at least one heating element (98) is an integral electrical heating element (98) with at least one terminal portion (99).

25. Hot runner injection molding apparatus as claimed in claim 20 wherein the plate-like body (92) is a one-piece body (92) into which the at least one heating element (98) is integrally cast.

26. Hot runner injection molding apparatus as claimed in claim 20 wherein the plate-like body (92) is a one-piece body (92) with a rear face (130) and a front face (132), at least one of the rear and front faces (130, 132) having a channel (128) in which the at least one heating element (98) is integrally brazed.

27. Hot runner injection molding apparatus as claimed in claim 17 wherein the plate-like body (92) has a rear plate (94) and a front plate (96) joined together with the at least one heating element (98) extending therebetween.

28. Hot runner injection molding apparatus as claimed in claim 27 wherein the rear plate (94) has a front face (100) and the front plate (96) has a rear face (102), at least one of the front face (100) of the rear plate (94) and the rear face (102) of the front plate (96) having a channel (104, 106) in which the heating element (98) extends.

29. Hot runner injection molding apparatus as claimed in claim 28 wherein the rear plate (94) and the front plate (96) are integrally brazed together and the at least one heating element (98) is an electrical heating element (98) integrally brazed into said channel (104, 106).

30. Hot runner injection molding apparatus as claimed in claim 17 wherein the plate-like body (92) has an opening (120) extending therein to received a thermocouple element (122).

31. In a hot runner injection molding apparatus having a mold defining at least one cavity, a melt distribution manifold (26) and a plurality of nozzles (10) seated in the mold (14) with a melt passage (72) branching in the melt distribution manifold (26) from a common inlet (74) and extending through each of the nozzles (10) towards at least one cavity (86), the improvement comprising:

a plurality of heaters (38) each mounted between the melt distribution manifold (26) and at least one of the nozzles (10), each heater (38) having a plate-like body (92) and means to heat the plate-like body (92), the plate-like body (92) being made of a thermally conductive material and having a rear face (130), a front face (132), and at least one melt bore (70) extending therethrough, each of said melt bores (78) defining a substantially straight path through the plate-like body (92) from the rear face (130) to the front face (132) thereof, the rear face (130) abutting against the melt distribution manifold (26), the front face (132) abutting against the at least one nozzle (10), the at least one melt bore (78) forming a portion of the melt passage (72).

32. Hot runner injection molding apparatus as claimed in claim 31 having means to individually adjust the temperature of each heater (38).

33. An injection molding manifold heater (38) as claimed in claim 1 wherein the heater is adapted to be removably mounted between a melt distribution manifold (26) and an injection molding nozzle (10).

34. An injection molding heater (38) as claimed in claim 33 wherein the at least one melt bore (78) transfers pressurized melt from the melt distribution manifold (26) to the injection molding nozzle (10).

35. An injection molding heater as claimed in claim 1 wherein all of said melt bores (78) extend substantially perpendicularly to the front face (132) of the plate-like body (92).

36. Hot runner injection molding apparatus as claimed in claim 17 wherein all of said melt bores (78) extend substantially perpendicularly to the front face (132) of the plate-like body (92).

37. Hot runner injection molding apparatus as claimed in claim 31 wherein all of said melt bores (78) extend substantially perpendicularly to the front face (132) of the plate-like body (92).

38. Hot runner injection molding apparatus as claimed in claim 31 wherein the plate-like body (92) of each heater (38) has a rear face (130) and a front face (132), the rear face (130) of the plate-like body (92) abutting against the melt distribution manifold (26) and the front face (132) of the plate-like body (92) abutting against the at least one nozzle (10).

\* \* \* \* \*